DUAL BEAM OPTICAL SYSTEM FOR FACSIMILE SCANNERS

Filed Jan. 5, 1948 2 Sheets-Sheet 1

*INVENTOR.*
LA VERNE C. WALKER
*BY* Alfred W. Barber
*ATTORNEY*

INVENTOR.
LA VERNE C. WALKER
BY Alfred W. Barber
ATTORNEY

Patented July 17, 1951

2,560,614

UNITED STATES PATENT OFFICE 2,560,614

DUAL BEAM OPTICAL SYSTEM FOR FACSIMILE SCANNERS

La Verne C. Walker, Baldwin, N. Y., assignor to Faximile, Inc., New York, N. Y., a corporation of Delaware Application January 5, 1948, Serial No. 623

3 Claims. (Cl. 178—7.1)

The present invention consists of a facsimile system, and in particular, a facsimile scanner exciter lamp mounting method and means.

The term facsimile is commonly applied to the art of transmission of graphic material from distant points over wire or radio links, through the medium of electrical signals representing density variations of the subject copy. The subject copy to be transmitted is usually scanned point by point and line by line by means of a small spot of light reflected from the copy into a photoelectric cell, where density variations in the copy induce electrical signal variations. These signal variations are amplified and conveyed to a distant point through suitable means. In order to provide fine detail it is necessary that the facsimile scanner light source provide a comparatively small light flooded area, directly in line with the pickup lens as it scans the subject copy. The present invention concerns a simple and effective mounting device for a scanner exciter lamp, permitting quick and accurate adjustment of these lamps to provide a small scanning spot and to insure accurate alignment of the spot with a photoelectric cell, through the pickup lens.

One object of the present invention is to provide a more accurately adjustable exciter lamp mounting for facsimile scanners or the like.

Another object is to provide an exciter lamp mounting which may be quickly and accurately adjusted to provide optimum performance in the facsimile scanner or the like.

Still another object is to provide increased efficiency in illuminating a scanning spot in a facsimile scanner or the like.

A still further object of the present invention is to provide a simple, effective method and means for bringing together light from two directions to illuminate a scanning spot in a facsimile scanner or the like.

These and other objects will be apparent from the detailed description of the invention given in connection with the various figures in the drawings.

Figure 1:
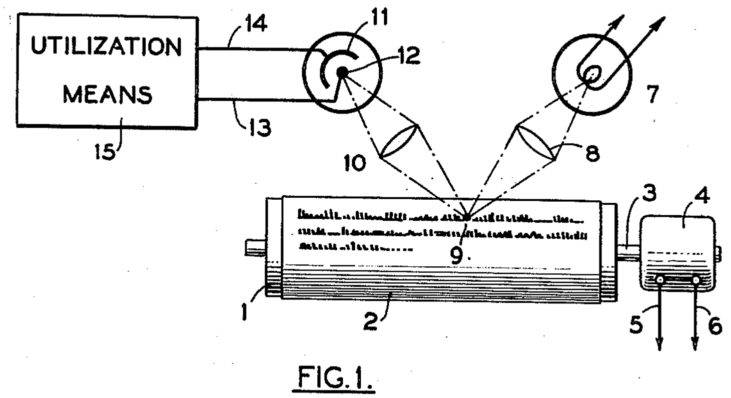
Fig. 1 shows a simplified drawing of the essential elements of a facsimile scanner.

Fig. 1 shows a simplified view of a facsimile scanner in which copy drum 1 carries a copy 2 to be scanned, and is rotated through the medium of shaft 3 by means of motor 4 receiving power over leads 5 and 6. A scanning spot on the copy sheet 2 is provided at 9 from light source 7 through lens 8. The density variations caused by scanning the copy 2 by spot 9 are impressed upon photoelectric cell 11 and 12 through lens 10. The resulting signal variations in photoelectric cell 11 and 12 are applied to suitable utilization means 15 over leads 13 and 14. In order to provide a sharply focused spot 9, it is necessary to adjust and maintain the relative positions of lens 8 and lamp 7.

Figure 2:
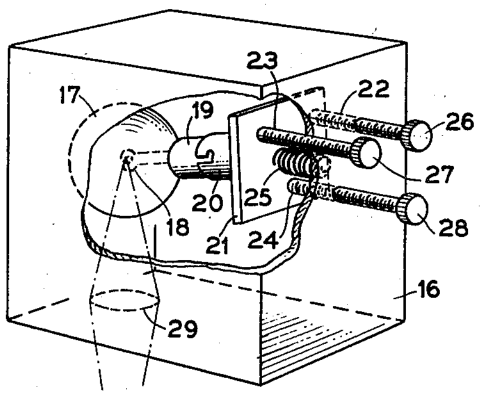
Fig. 2 shows an exciter lamp mounting according to the present invention.

Fig. 2 shows an exciter lamp mounting system which provides quick, accurate and flexible adjustment of the lamp position. Exciter lamp 17 fulfilling the function of lamp 7 (Fig. 1) has a filament 18 and is mounted in a socket 20 by means of base 19. Socket 20 is carried by a mounting plate 21. Three points of adjustment of plate 21 are provided by adjustment screws 22, 23 and 24 having adjusting heads 26, 27 and 28 respectively. Mounting plate 21 is pulled against the three adjustment screws by spring 25. The three adjusting screws will evidently provide fine and accurate adjustment of the position of lamp 17 and, since they may be adjusted from outside the lamp house 16, such adjustments may be readily made. The light from filament 18 passes through a suitable lens 29 to a copy drum not shown.

Figure 3:
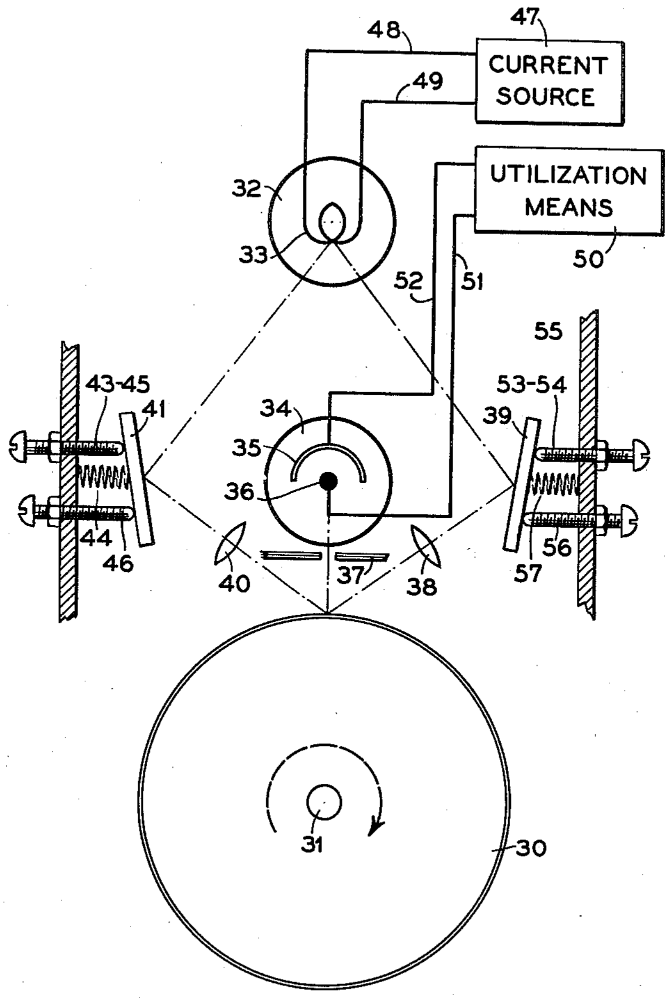
Fig. 3 shows a modified form of the present invention.
Figure 3A:
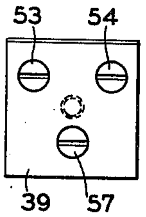

Fig. 3 shows a modified form of the present invention, in which light from two directions is directed upon copy drum 30 mounted on shaft 31. The light from two directions may be provided in any suitable manner, for instance, from filament 33 of lamp 32 energized from current source 47 over leads 48 and 49. Light from filament 33 passes over two divergent paths to mirrors 39 and 41 from which the paths are reflected through lenses 38 and 40 respectively to a common point on copy drum 30. Mirror 39 is provided with three adjusting screws 53, 54 and 56, and is held against them by means of spring 57. Similarly mirror 41 is adjustable by means of screws 43, 45 and 46 and is held against them by means of spring 44. The three adjusting points of the two mirrors permit them to be readily adjusted in any direction to bring the light beams into coincidence upon the surface of the copy drum 30. The light reflected from the copy on drum 30 is directed into photoelectric cell 34 through a suitable aperture 37 and the resulting electrical signals generated between anode 35 and cathode 36 of the photoelectric cell are applied to utilization means 50 over leads 51 and 52. Fig. 3A, shows a side view of mirror 39 clearly demonstrating the relative position of screws 53, 54 and 57. The simplicity of the arrangement will be apparent from the few parts required, while its flexibility arises from the three-point adjustment arrangement. Due to the spring tension, the mirrors, when once adjusted, readily hold their position during operation. If readjustment becomes necessary, it may be readily, quickly and accurately made by adjusting one or more of the adjusting screws. If lamp 32 is replaced by means of a new lamp in which filament 33 is not in the exact position of the original filament, the two images reflected from the two mirrors can be quickly brought into coincidence by adjusting one or more of the adjusting screws bearing against the mirrors.

While only two forms of the present invention have been shown and described, many modifications will be apparent to those skilled in the art within the spirit and scope of the invention as set forth in the appended claims.

What is claimed is:

1. In a facsimile scanner having a photoelectric cell arranged to receive reflected light from a spot on the subject copy, two-path copy illuminating means comprising an exciter lamp disposed on the side of the photoelectric cell opposite from the subject copy, reflectors arranged substantially equidistant from the exciter lamp on two sides of the photoelectric cell, and means for adjusting the attitude of each of said reflectors so that each will receive light from said exciter lamp and direct the light to said spot on the subject copy, whereby the spot is brightly illuminated from two directions eliminating shadows due to surface irregularities of the subject copy.

2. The combination of claim 1 and in addition a lens disposed between each reflector and the subject copy to concentrate the light from the exciter lamp on the spot on the subject copy.

3. A facsimile scanner comprising a rotatable copy drum, a photoelectric cell arranged to receive reflected light from a spot on the copy, an exciter lamp disposed on the side of the photoelectric cell opposite from the copy, said photoelectric cell and exciter lamp being arranged in a line perpendicular with and passing through the axis of rotation of said copy drum, two reflectors arranged symmetrically on opposite sides of said line beside said photoelectric cell, means for adjusting the attitude of each of said reflectors so that each receives light from said exciter lamp and directs it around the photoelectric cell to said copy, and a lens disposed between each reflector and the copy concentrating the light from the reflectors on said spot on the copy, whereby the spot is brightly illuminated from two directions eliminating shadows due to surface irregularities of the subject copy.

LA VERNE C. WALKER.

REFERENCES CITED

The following references are of record in the file of this patent:

UNITED STATES PATENTS

| Number | Name | Date |
|---|---|---|
| 1,604,839 | Amidon | Oct. 26, 1926 |
| 1,658,556 | Foster | Feb. 7, 1928 |
| 1,740,834 | Ranger | Dec. 24, 1929 |
| 1,781,800 | Baird | Nov. 18, 1930 |
| 1,870,465 | Rathbun | Aug. 9, 1932 |
| 1,894,132 | Stone | Jan. 10, 1933 |
| 2,041,127 | Gray | May 19, 1936 |
| 2,209,719 | Rustad | July 30, 1940 |
| 2,251,613 | Kott | Aug. 5, 1941 |
| 2,258,993 | Matsinger | Oct. 14, 1941 |
| 2,292,230 | Lemon | Aug. 4, 1942 |

FOREIGN PATENTS

| Number | Country | Date |
|---|---|---|
| 704,978 | Germany | Mar. 13, 1941 |
| 865,718 | France | May 31, 1941 |